No. 771,894. PATENTED OCT. 11, 1904.
R. F. BRUMBAUGH.
EDGING ATTACHMENT FOR PLANING MACHINES.
APPLICATION FILED JULY 26, 1904.
NO MODEL. 3 SHEETS—SHEET 1.

Witnesses
Joseph A. Minturn
G. O. Coleman

Inventor
Robert F. Brumbaugh,
by
Frank W. Woerner,
Attorney.

No. 771,894. PATENTED OCT. 11, 1904.
R. F. BRUMBAUGH.
EDGING ATTACHMENT FOR PLANING MACHINES.
APPLICATION FILED JULY 26, 1904.
NO MODEL. 3 SHEETS—SHEET 2.
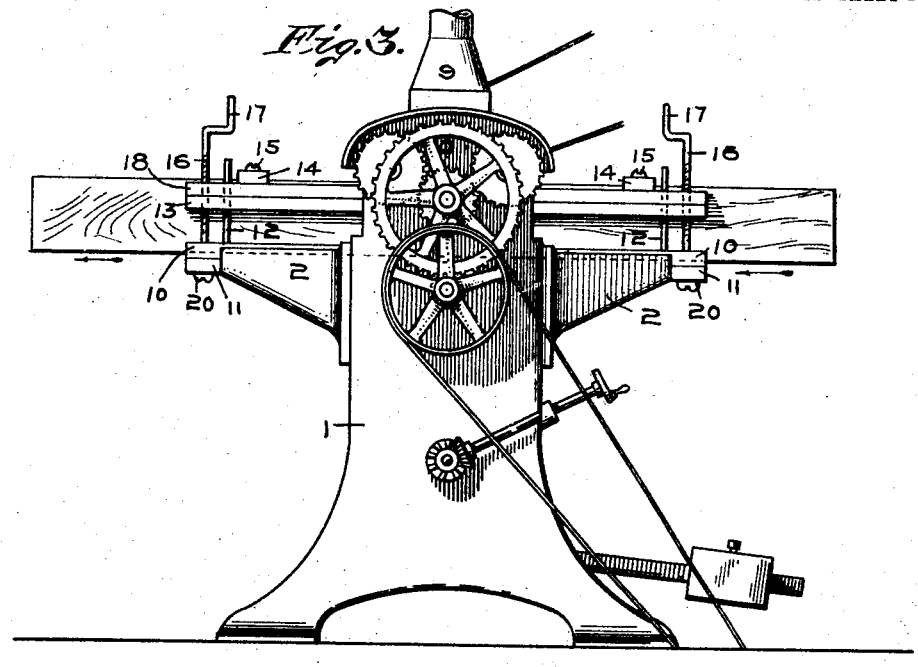
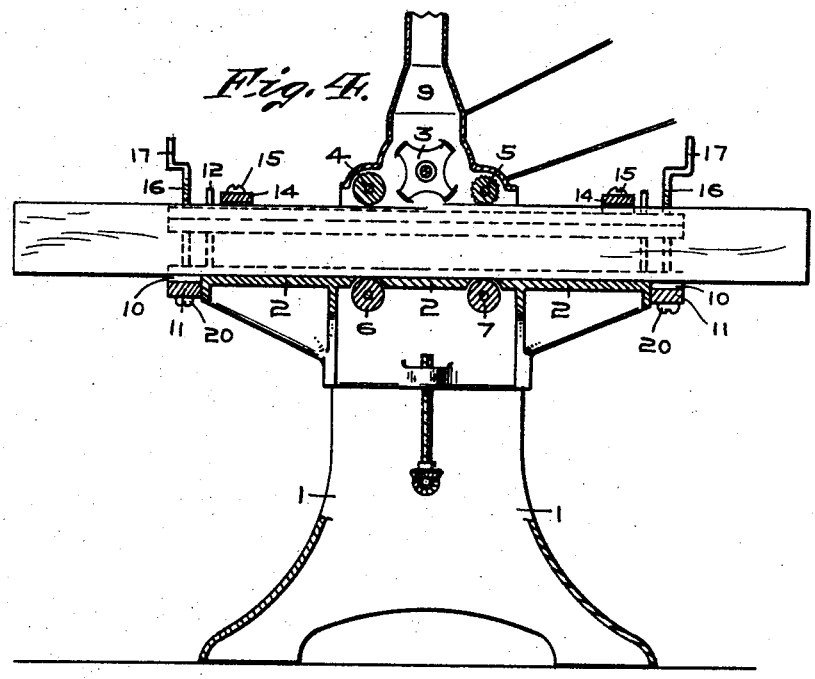
Witnesses
Joseph A. Minturn,
D. O. Coleman
Inventor
Robert F. Brumbaugh,
by Frank W. Woerner,
Attorney.

No. 771,894. PATENTED OCT. 11, 1904.
R. F. BRUMBAUGH.
EDGING ATTACHMENT FOR PLANING MACHINES.
APPLICATION FILED JULY 26, 1904.
NO MODEL. 3 SHEETS—SHEET 3.
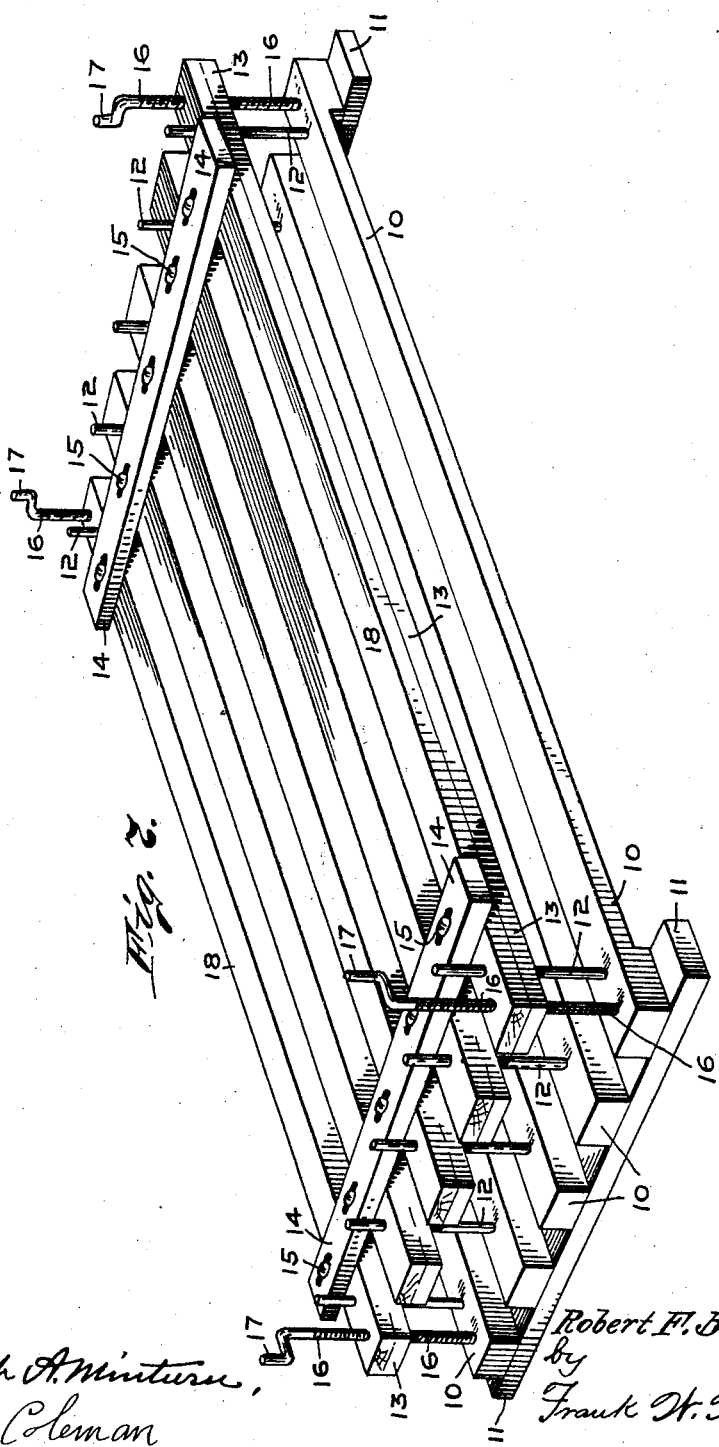

No. 771,894. Patented October 11, 1904.

UNITED STATES PATENT OFFICE.

ROBERT F. BRUMBAUGH, OF MONTPELIER, INDIANA.

EDGING ATTACHMENT FOR PLANING-MACHINES.

SPECIFICATION forming part of Letters Patent No. 771,894, dated October 11, 1904.

Application filed July 26, 1904. Serial No. 218,260. (No model.)

*To all whom it may concern:*

Be it known that I, ROBERT F. BRUMBAUGH, a citizen of the United States, residing at Montpelier, in the county of Blackford and State of Indiana, have invented certain new and useful Improvements in Edging Attachments for Planing-Machines, of which the following is a specification.

This invention relates to improvements in wood-planing machines; and the object is to provide simple and convenient means applicable as an attachment to the planers in common use for reducing boards to a uniform width and dressing their edges.

The object also is to provide a machine that will do rapid and accurate work.

I accomplish the objects of the invention by the mechanism illustrated in the accompanying drawings, in which—

Figure 1 is a plan view of an ordinary "pony" planer with my invention attached thereto in operative position; Fig. 2, an end view of same; Fig. 3, a side elevation; Fig. 4, a vertical section on the line 4 4 of Fig. 2; Fig. 5, an enlarged detail in plan view of the adjustable mechanism for holding the boards; Fig. 6, a vertical section on the line 6 6 of Fig. 5, and Fig. 7 a perspective view of the invention detached from the planing-machine with which it operates.

Like characters of reference indicate like parts throughout the several views of the drawings.

1 is the body of a wood-planing machine of any usual and well-known construction, such as the ordinary pony planer.

2 is the bed-plate or table; 3, a rotary cutter mounted above the table transversely of it.

4 and 5 are positively-driven feed-rolls mounted one on each side of the cutter and parallel with it, and below, just projecting through the table, are the feed-rolls 6 and 7.

All of the above parts are of the usual and well-known construction and are driven in the usual manner.

8 is a hood terminating the suction-pipe 9 for carrying off the shavings.

10 represents a series of bars, here shown as five in number, laid parallel with each other longitudinally of the table. The ends of each of said bars are bolted to the transverse bars 11, the holes for the bolts 20 in the bars 11 being longitudinal slots, whereby the distances between the bars 10 may be adjusted.

The bars 10 have the vertical pins 12, which pass through perforations in bars 13. The latter are of the same length and width as the underlying bars 10 and are parallel with said bars 10. They are joined together by the transverse outlying bars 14, which are bolted at each intersection to said bars 13 by means of the bolts 15, the bolt-holes in the transverse bars 14 being longitudinal slots, which permit of the lateral adjustment of the bars 13.

At each end of the two outside bars of the top series of bars 13 are the threaded bolts 16, the lower ends of which bear against the tops of the lower bars 10. The upper ends of the bolts 16 have cranks 17 for rotating the screws to regulate the distances between the bars 10 and 13.

The several series of bars connected as above described form a frame unit which can be quickly placed in position or removed as a whole. The lumber to be edged having first been planed on its sides to a uniform thickness is introduced edges up between the several horizontal pairs of bars in the manner as shown in Fig. 1. It will be seen that there are three boards to each set and four sets of boards passing under the rotary cutter at one time, and the distances between the upper and lower series of bars can be adjusted by means of the corner-screws, and the distances between the bars of each series are adjustable by means of the bolts and slotted openings in the bars. The tops of the bars 13 are surfaced with wood 18 to protect the bits of the rotary cutter.

Having thus fully described my invention, what I claim as new, and wish to secure by Letters Patent, is—

1. In a machine for edging lumber, a series of bars arranged horizontally, said bars being separated from each other, a second series of bars also separate from each other and above the first, means for regulating the distance between the two series, means for feeding boards between the separated bars and means for edging the boards as they pass through.

2. In a machine for edging lumber, a series of horizontal parallel separated bars, means for holding them in fixed relation to each other, a second series of bars of like number above and parallel with the first, means for holding them in fixed relation to each other, screws to regulate the distance between the two series of bars and guides to direct the movements of the top bars.

3. In a machine for edging lumber, a series of horizontal separated bars, adjustable means for holding them in a given relation to each other, a second series of bars of like number above the first, means for holding them in a given relation to each other, guides to direct the movements of the top bars and screws to regulate their distances from the lower bars.

4. In a machine for edging lumber, an attachment comprising a series of horizontal separated bars, transverse bars having longitudinal slots to receive bolts from the first bars, a second series of horizontal separated bars above the first, transverse longitudinally-slotted bars bolted to said second series, guide-rods secured to one of said series of bars and passing through perforations in the other series and threaded bolts passing through bars of one series and bearing against bars of the other series.

In witness whereof I have hereunto set my hand, at Montpelier, Blackford county, Indiana, this 18th day of July, A. D. 1904.

ROBERT F. BRUMBAUGH.

Witnesses:
 HARRY T. NOTE,
 BERT. C. HARTLEY.